United States Patent
Huang et al.

(10) Patent No.: US 6,791,678 B2
(45) Date of Patent: Sep. 14, 2004

(54) SYSTEM AND METHOD FOR OBTAINING SPIN AND MECHANICAL TWIST DATA DURING OPTICAL FIBER DRAW

(75) Inventors: Haiying Huang, Atlanta, GA (US); Zhi Zhou, Lawrenceville, GA (US); Harry Douglas Garner, Lawrenceville, GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 10/202,560

(22) Filed: Jul. 23, 2002

(65) Prior Publication Data

US 2004/0017557 A1 Jan. 29, 2004

(51) Int. Cl.[7] .............................................. G01N 21/00
(52) U.S. Cl. ...................................................... 356/73.1
(58) Field of Search ........................... 356/73.1; 65/402, 65/504, 377–378; 57/3–18, 293–294; 250/559.13, 559.01

(56) References Cited

U.S. PATENT DOCUMENTS

| | | | |
|---|---|---|---|
| 5,228,893 A | * | 7/1993 | Smithgall et al. .............. 65/377 |
| 5,298,047 A | | 3/1994 | Hart, Jr. et al. |
| 5,316,562 A | * | 5/1994 | Smithgall et al. .............. 65/377 |
| 5,826,419 A | | 10/1998 | Shelander et al. |
| 6,240,748 B1 | | 6/2001 | Henderson et al. |

OTHER PUBLICATIONS

Franco Cocchini, A. Mazzotti, A. Ricco, and A. Rossi; *On–Line Fiber Spinning Monitoring for Low–PMD Optical Fibers*; Proceedings of the 49th International Wire and Cable Symposium, Atlantic City, N.J., Nov. 13–16, 2000.

* cited by examiner

*Primary Examiner*—Tu T. Nguyen
(74) *Attorney, Agent, or Firm*—Alston & Bird LLP (57) ABSTRACT

A system and method is disclosed for determining information regarding the result of introducing a rotational force on an optical fiber during manufacturing. A rotational deformation of the molten fiber, called spin, is imparted that becomes permanent upon cooling of the fiber. The rotational force also introduces twist on the cooled fiber, which is a non-permanent, mechanical rotation of the fiber. The system and method uses a diameter measuring device that produces a signal corresponding to the fiber's diameter with respect to time. Since the fiber is slightly elliptical in practice, periodic variations in the diameter measurement signal are detected that reflect the rotation imparted into the fiber. The signal is further processed to provide data regarding the effect of the rotations introduced into the fiber, namely the twist and spin present in the fiber.

17 Claims, 8 Drawing Sheets

SYSTEM AND METHOD FOR OBTAINING SPIN AND MECHANICAL TWIST DATA DURING OPTICAL FIBER DRAW

BACKGROUND OF THE INVENTION

This invention relates to systems and methods for obtaining spin and mechanical twist data for an optical fiber. Specifically, the systems and methods of the present invention measures the rate of rotation imparted into a molten fiber as well as the rate of mechanical rotation introduced on a cooled fiber as it is drawn from a preform. This application is being filed concurrently with application Ser. No. 10/202,540 entitled Systems And Methods For Forming Ultra-Low PMD Optical Fiber Using Amplitude And Frequency Keyed Fiber Spin Functions, which is incorporated by reference into this application.

It is well known that the so-called 'single mode optical fiber' commonly used in communications systems is not completely symmetric in its cross-sectional geometry. Rather, the cross section of a typical optical fiber is slightly elliptical in shape and can be attributed in part to various factors present during manufacturing. This imperfection contributes to the degradation of the signals carried by optical fibers, particularly at high transfer speeds. One type of degradation is called polarization mode dispersion (PMD). PMD relates to the two orthogonal modes of light rays that propagate through the fiber. Because of the non-circular shape, as well of other imperfections and internal stresses, these two modes may propagate with different propagation constants. The difference between the propagation constants is called birefringence.

Various attempts to reduce PMD have been made and involve imparting a rotation into the fiber during manufacturing. One prior art method of reducing PMD involves spinning the preform during the fiber drawing process. See, for example, Barlow, et al., Applied Optics, 20:2962–2968, 1981; Payne, et al., IEEE Journal of Quantum Electronics, QE-18:477–487, 1982; Rashleigh, "Fabrication of Circularly Birefringent Single Mode Fibers," Navy Technical Disclosure Bulletin 5:7–12, 1980; and PCT Patent Publication No. WO 83/00232. The spinning causes the internal geometric and/or stress asymmetries of the fiber to rotate about the fiber's axis. By performing the spinning during drawing, i.e., when the root of the preform is substantially molten, essentially pure rotation is performed on the fiber asymmetries, as opposed to a combination of rotation of the asymmetries and the introduction of rotational stress as would occur if the fiber were twisted after having been drawn. For a discussion of the use of twist to reduce PMD, see, for example, Schuh et al., Electronics Letters, 31:1172–1173, 1995; and Ulrich, et al., Applied Optics, 18:2241–2251, 1979.

However, spinning the molten preform presents operational difficulties. Given the desired draw rate, the semi-solid/semi-molten preform must be spun at a high rate of rotation (several thousand r.p.m.). Alternatives have been developed which rely on manipulating the fiber as it is drawn, and keeping the preform stationary. A rotation can be imparted into the fiber by altering the angle of take-up rollers, which pull the fiber from the preform. See, for example, U.S. Pat. No. 5,298,047. Regardless of which method is used, a spin is imparted into the optical fiber and the amount of spin imparted impacts the degree to which PMD is reduced. When a spin is "impressed" on the fiber, the fiber material in the hot zone is torsionally deformed and results in the deformation being 'frozen' into the fiber as it cools from its molten state. Once cooled, the fiber exhibits a permanent "spin", i.e., a permanent torsional deformation. The amount of spin that is actually introduced into the molten fiber is not always the same as the amount that is attempted to be introduced. There are various factors affecting the rotational transfer imparted into the fiber. For example, the fiber may 'slip' on the rollers that impart the twist and the length of fiber span between the molten fiber and the spinning apparatus impacts the degree of cooling, and thus the amount of spin actually imparted. Consequently, the spin actually introduced compared to the spin attempted to be introduced is less than 100% and cannot always be predicted at any given moment in time.

Consequently, a mechanism for measuring the actual amount of spin imparted at any moment in time during production is advantageous to verify that the appropriate levels of spin are introduced into the fiber. The existence of the imparted spin can be readily ascertained, e.g., by microscopic examination of bubbles in the fiber to determine rotation of core ovality or eccentricity, or by means of a traveling magneto-optic modulator, as used by M. J. Marrone et al., Optics Letters, Vol. 12(1), p. 60. However, microscopic examination of bubbles in the fiber or similar techniques require destruction of the fiber and are undesirable. Such analysis provides little opportunity to monitor the formation of spin in real time and affect the manufacturing in situ. Further, microscopic examination is both time and labor consuming, in addition to being destructive. Additionally, such examination only allows determination of spin at sampled points—determination of spin all along a fiber cable would be impractical using this method and would destroy the optical fiber.

One such mechanism to monitor the spin in real time was proposed by F. Cocchini, A. Mazzotti, A. Ricco, and A. Rossi, *On-Line Fiber Spinning Monitoring for Low PMD Optical Fibers,* Proceedings of the 49$^{th}$ International Wire and Cable Symposium, Atlantic City, N.J. Nov. 13–16, 2000. This scheme uses real time Fourier analysis of the fiber diameter data as obtained by transverse on-line measurements of the optical fiber shortly after is it drawn from the preform. The system used power spectrum analysis to correlate the signals with the spin rate. The presence of high output frequencies correlates to high spin rates.

However, the use of Fourier transform analysis is complicated and requires significant computer processing, and requires further analysis to correlate the results with the spin rate. Because of the vast amounts of data produced in real time, the processing power required to analyze such results in real time is significant. Thus, while the prior art can measure the spin rate, it may not be practical to perform real-time measurements so as to provide feedback to control systems that affect the spinning apparatus during the manufacturing process. Consequently, a simpler mechanism for determining real time spin rate is needed that requires less processing power and that can determine spin in real time.

In addition to 'spin', another metric regarding optical fibers that is measured during the manufacture is 'twist'. The spin and twist metrics are related, and some may use such terms interchangeably. However, as used herein, spin refers to the rotation introduced into the molten optical fiber, whereas as 'twist' refers to the rotation introduced onto the cooled optical fiber. Spin is imparted into the molten fiber, and is permanently fixed when the fiber has cooled. Twist refers to the mechanical rotational force imposed on the optical fiber after it has cooled. Twist introduces torsional stresses on the fiber, and extreme amounts can cause microscopic cracks, and ultimately physical destruction of the fiber. It is desirable to reduce or eliminate twist introduced on the fiber. One method of reducing twist on optical fiber is to 'respool' the fiber by unwinding it and rewinding the fiber, which is also time consuming and labor intensive. It would be preferable to avoid or minimize the introduction of twist to acceptable levels during manufacturing. In either case, a method of measuring the levels of twist in the optical fiber during manufacturing is required. Therefore, there is a need for systems and methods for measuring twist introduced on optical fibers.

SUMMARY OF INVENTION

In one embodiment of the invention, a method is disclosed for measuring spin imparted in optical fibers by measuring the diameter of an optical fiber as it is drawn from a molten preform, detecting the periodic minimum and maximum diameters, processing the diameter measurements and the draw rate to determine the spin imparted into the optical fiber.

In another embodiment of the invention, a system is disclosed that measures the spin imparted into an optical fiber comprising an apparatus for drawing fiber from a molten preform, a measurement device measuring the diameter of the fiber as it is drawn, a processor receiving inputs regarding the fiber draw rate and diameter measurements and determining the spin rate in the optical fiber.

In another embodiment of the invention, a method of determining twist on an optical fiber is disclosed by drawing an optical fiber, monitoring the rate of draw of said optical fiber, measuring a first diameter of the optical fiber at a first point as it is being drawn and detecting periodic diameter measurements, and processing said periodic diameter measurements and determining the twist on the optical fiber.

In another embodiment of the invention, a method for measuring rotations along the principle axis in an optical fiber is disclosed where the optical fiber is drawn past a fiber diameter measuring device at a known draw rate, measurements of the diameter of the optical fiber is obtained by the fiber diameter measuring device, periodic changes in the diameter of the optical fiber is determined, and the periodic changes in the measurements is processed in conjunction with said known draw rate to measure the rotations along the principle axis of the optical fiber.

BRIEF DESCRIPTION OF THE DRAWINGS

Having thus described the invention in general terms, reference will no be made to the accompanying drawing, which are not necessarily drawn to scale, and wherein:

FIG. 3 illustrates an exemplary fiber diameter measuring mechanism according to one embodiment of the present invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As faster and faster transmission speeds are used to convey information using optical fiber, the quality of the optical fiber becomes more critical. Various imperfections that are insignificant factors at low transmission speeds can become significant factors effecting higher transmission speeds. One such imperfection associated with the optical fiber is a type of distortion called Polarization Mode Dispersion (PMD). It is well known that single mode fiber actually contains two polarization states of the fundamental mode. These states are orthogonal to each other, and can travel at different rates. Ideally, each mode travels at identical rates, but imperfections in the optic fiber can lead to birefringence, i.e., the relative propagation delay between the two polarization states.

Figure 1:
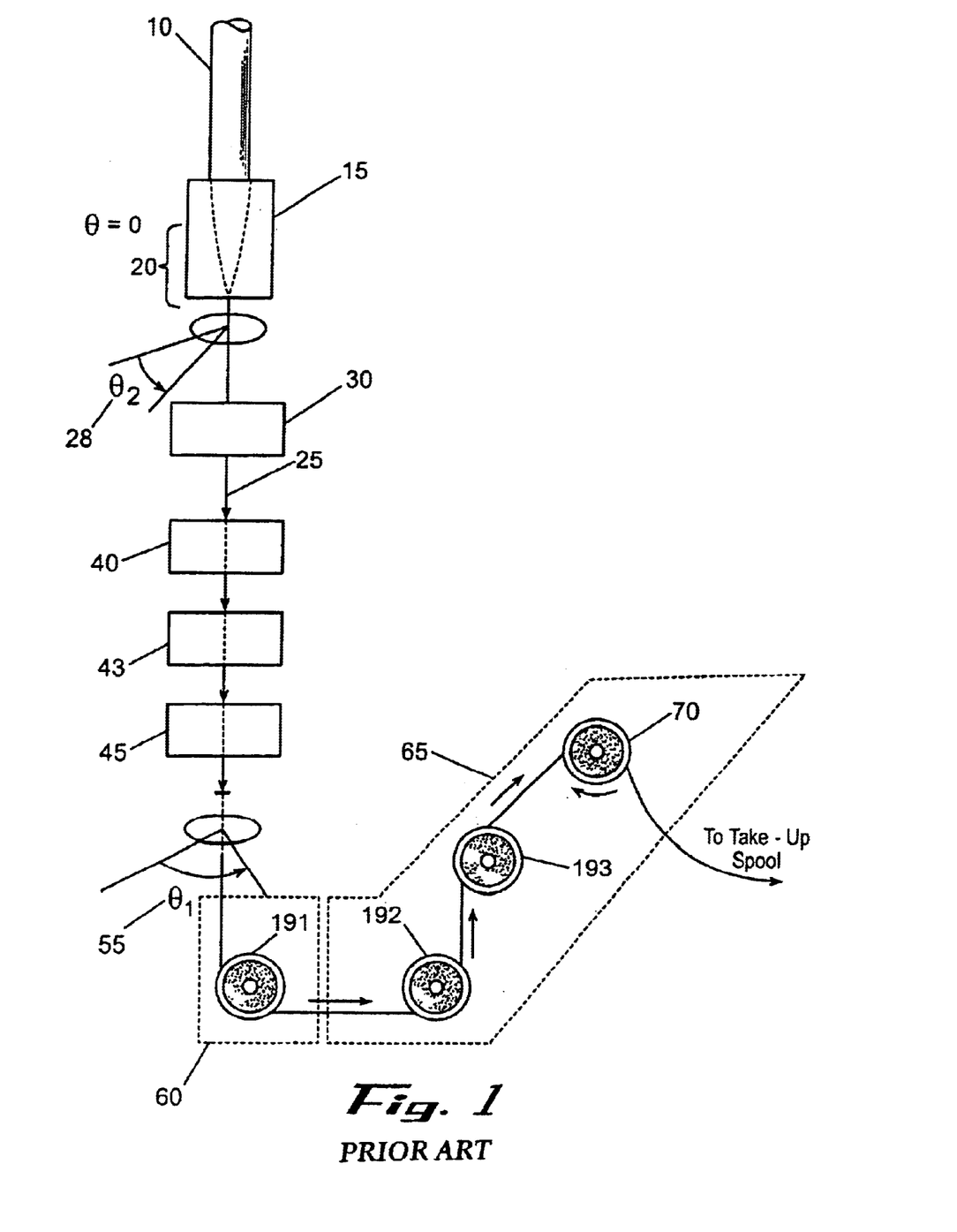
FIG. 1 depicts an embodiment of an exemplary prior art fiber optic drawing apparatus.

A well known method of reducing PMD is to rotate the optical fiber as it is being formed. FIG. 1 illustrates an exemplary apparatus for manufacturing fiber optic apparatus according to the prior art. A preform 10 of pure glass is previously formed to provide the material for the optical fiber. The preform is heated by a heat source 15 using conventional means. Once the preform is heated to its melting point and a fiber has been pulled, an angular area called the neck-down 20 is formed. A single optical fiber 25 emerges from the preform in a semi-molten state and passes through a diameter measuring device 30. The optical fiber continues to be pulled downward and passes through a coating applicator 40 that applies a coating to protect the optical fiber. The fiber may also pass through a unit 43, which cures the optical coating, and a unit 45 that monitors the overall diameter after the coating has been applied. The optical fiber than encounters a spinning apparatus 60 that imparts a spin into the fiber. Such mechanisms have been described in previous patents and may incorporate rollers or take-up wheels 191 (see, for example, U.S. Pat. No. 5,298, 047). The optical fiber then encounters a series of guide rollers 65 comprising individual rollers 192, 193 and eventually to a capstan 70 pulling the fiber. The fiber is then wrapped around a spool (not shown).

The spinning apparatus 60 imparts an angular movement $\theta_1$ 55 to the fiber. However, the spinning apparatus 60 is located at a distance from the neck down region 20 such that the fiber has cooled down somewhat by the time the coating is applied and further cooled once it comes into contact with the spinning apparatus. Thus, while the spinning apparatus imparts an angular movement $\theta_1$ 55 at a lower point, a different angular movement, $\theta_2$ 28, is impacted near the neck-down region 20 with the value of $\theta_1 > \theta_2$. This is due in part to:

1. the long span of fiber between the neck-down region and the spinning apparatus;
2. the viscous drag characteristics of the coating;
3. the viscous drag characteristic of the neck-down itself;
4. slippage of the fiber in spinning apparatus;
5. temperature differential of the fiber along its length.

Consequently, the efficiency of imparting a rotation into the molten fiber from the spinning apparatus is less than 100%. Since the amount of rotation imparted into the molten fiber is not the same that is attempted to be imparted, it is desirable to measure the rotation $\theta_2$ 28 in real time. If the angle $\theta_2$ 28 is known at various points in time, and the draw rate is known, then the distance of the fiber between measurements can be calculated and a rotation rate per meter can be derived.

Figure 2:
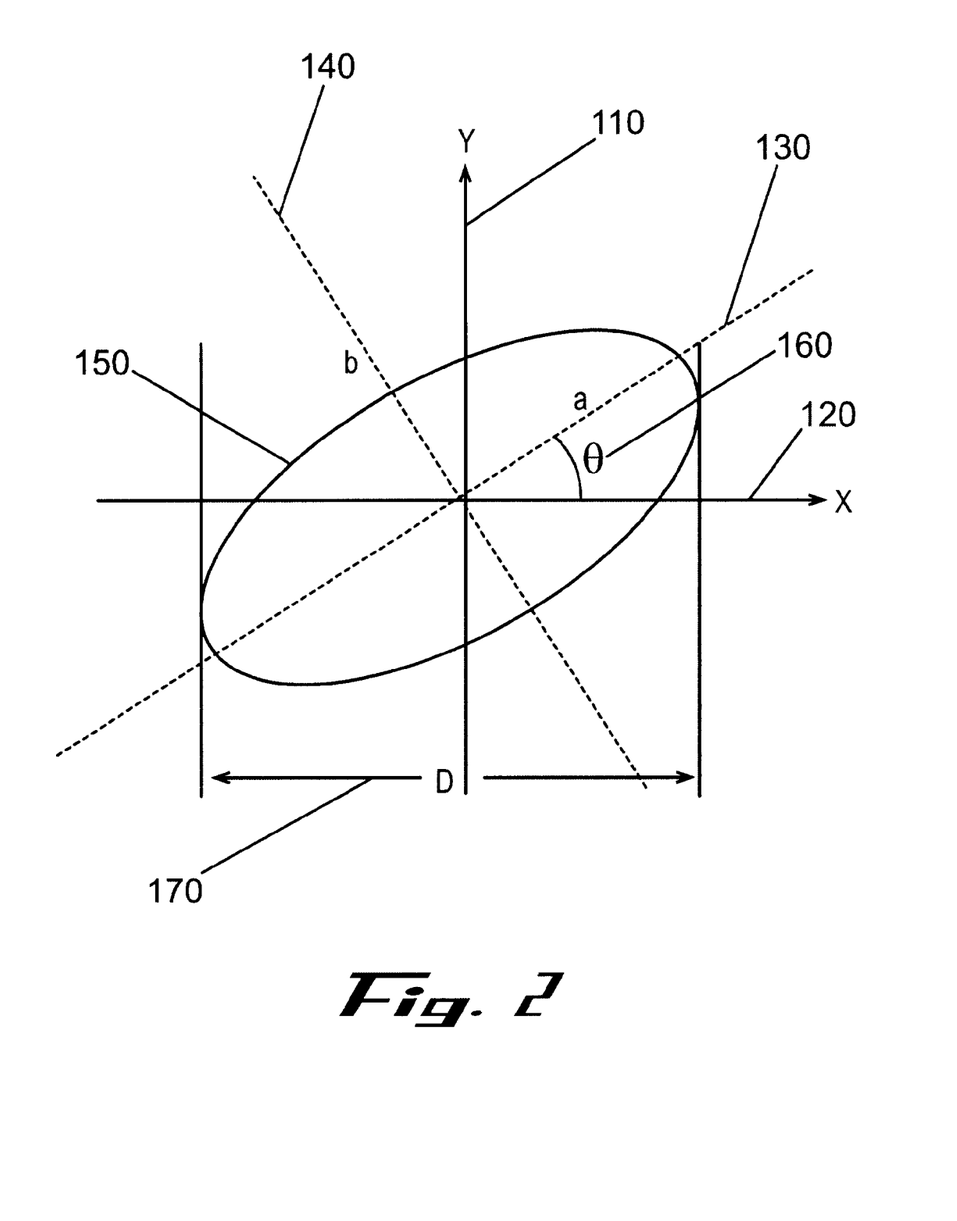
FIG. 2 illustrates a cross sectional view of an exemplary elliptical optic fiber.

The measurement of the rotation is based on the fact that the optical fiber is not perfectly circular. It is actually slightly elliptical, as illustrated in FIG. 2. FIG. 2 depicts an ellipse 150 in reference to an X axis 120 and Y axis 110 which are orthogonal to one another. The ellipse 150 can be described as having a major axis a 130 and a minor axis b 140 which are orthogonal to each other. At any given time, the ellipse can be described as having an angle of rotation, $\theta$ 160 that is measured between the major axis a 130 and the X axis 120. The sideview diameter D 170 is a function of $\theta$, and in the embodiment shown, the maximum sideview diameter occurs when $\theta$ is equal to 0 or 180 degrees. Conversely, the minimum sideview diameter occurs when $\theta$ is equal to 90 or 270 degrees. There are various mathematical methods for calculating the sideview diameter. One equation is shown below:

$$D_{measurement} = d_0 + \sum_{i=2}^{7} d_i \sin(i\theta + \phi_i)$$

where d0 is the average diameter, di is the harmonic amplitude, $\theta$ is the relative azimuthal position, and $\phi_i$ is the relative phase (rotation). For an optical fiber of elliptical shape, the second mode harmonics (i=2) is the dominated one. Thus, the diameter measurement would exhibit sinusoidal characteristics.

The diameter of the optical fiber is measured by the diameter monitor device (also called a diameter measurement device) 30 according to one embodiment of the present invention. A variety of methods may be used to measure the diameter of the fiber, and the present invention can be illustrated using a variety of diameter measurement devices. One such example is illustrated in FIG. 3. The diameter measurement device in this embodiment of the present invention monitors a fringe pattern of a light beam propagating through the optical fiber, where the fringe pattern is affected by the cross section of the optical fiber. Specifically, in this embodiment, the diameter measurement device directs laser light beams 310 through the cross section of the optical fiber 320. The optical fiber will bend the, light rays according to well known physical properties and create a fringe pattern after they pass through the fiber. The rays 330 then strike a line-scan-diode 340 that creates electrical signals correlating to the developed fringe pattern 350 which is dependent on the thickness of the fiber. Based on the angle $\theta$ 360, which represents the position of the cross section of the optical fiber, the signal from the line scan diode is modulated. The diameter monitor will sense a change in diameter based on the angle $\theta$ 360. Table 1 indicates the change in diameter according to $\theta$.

TABLE 1

| Angle of $\theta$ | Diameter Measurement of Optical Fiber |
| --- | --- |
| 0 | At maximum; value of diameter is decreasing |
| 90 | At minimum; value of diameter is increasing |
| 180 | At maximum; value of diameter is decreasing |
| 270 | At minimum; value of diameter is increasing |

Ideally, the diameter measurements would exhibit sinusoidal characteristics, periodically increasing and decreasing as the fiber is rotated. In reality, the diameter of the fiber measured is impacted by a variety of factors other than the spin rate, including the temperature of the heat source and potential temperature variation across the preform, rate of fiber draw, presence of microscopic air bubbles, and lateral mechanical vibrations in the optical fiber.

Figure 3A:
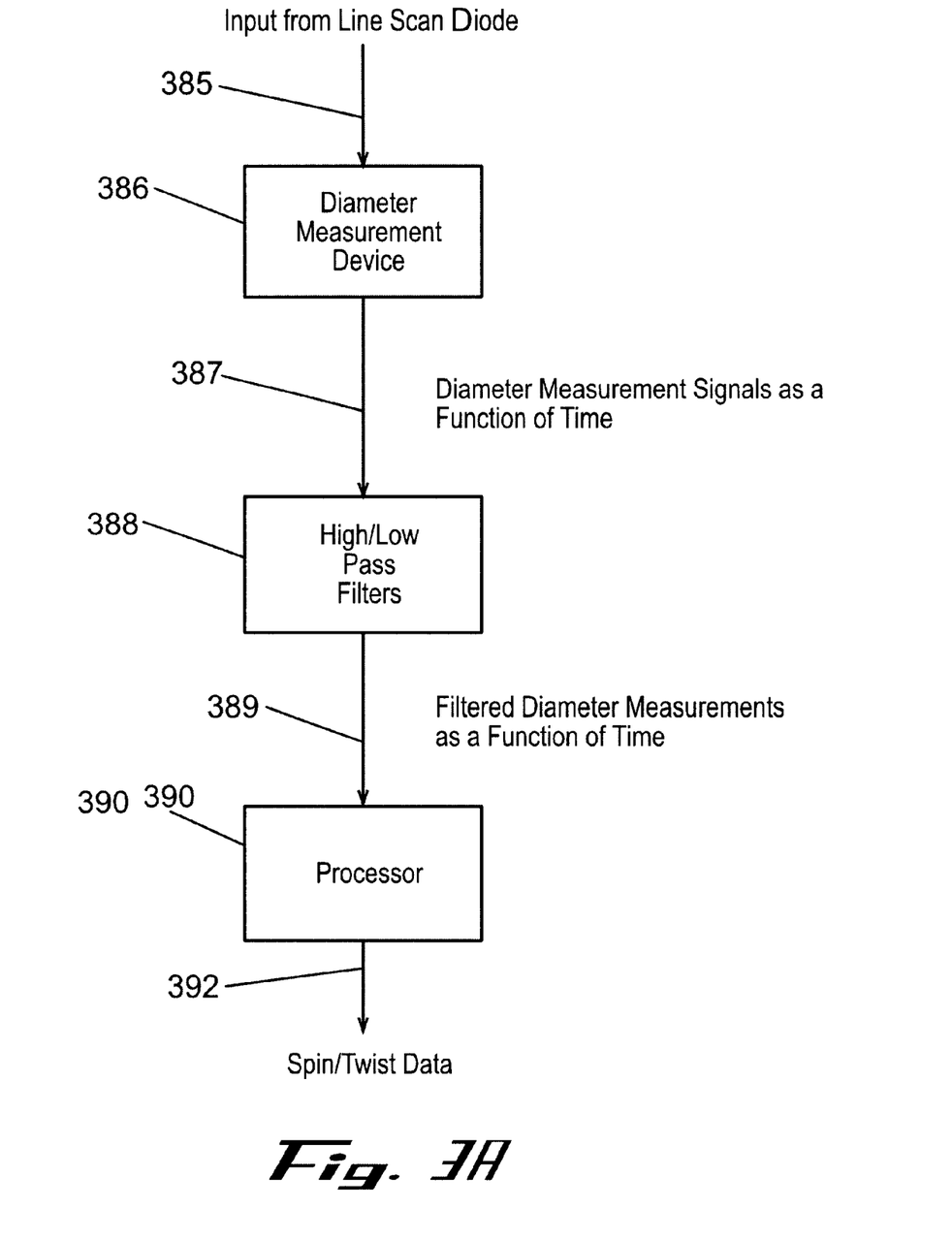
FIG. 3A illustrates functions of the system according to one embodiment of the present invention.

FIG. 3A illustrates the functions of the system of the present invention according to the present invention embodying the diameter measurement system illustrated in FIG. 3. Specifically, the diameter measurement device 386 receives input signals 385 from the line scan diode. The diameter measurement device 386 produces output 387 representing the diameter measurement signals as a function of time. These signals are filtered by the high/low pass filters 388 which produced the filtered diameter measurements as a function of time 389. These are received by a processor 390 which processes the data according to the principles of the current invention to produce spin and twist data 392.

Figure 4:
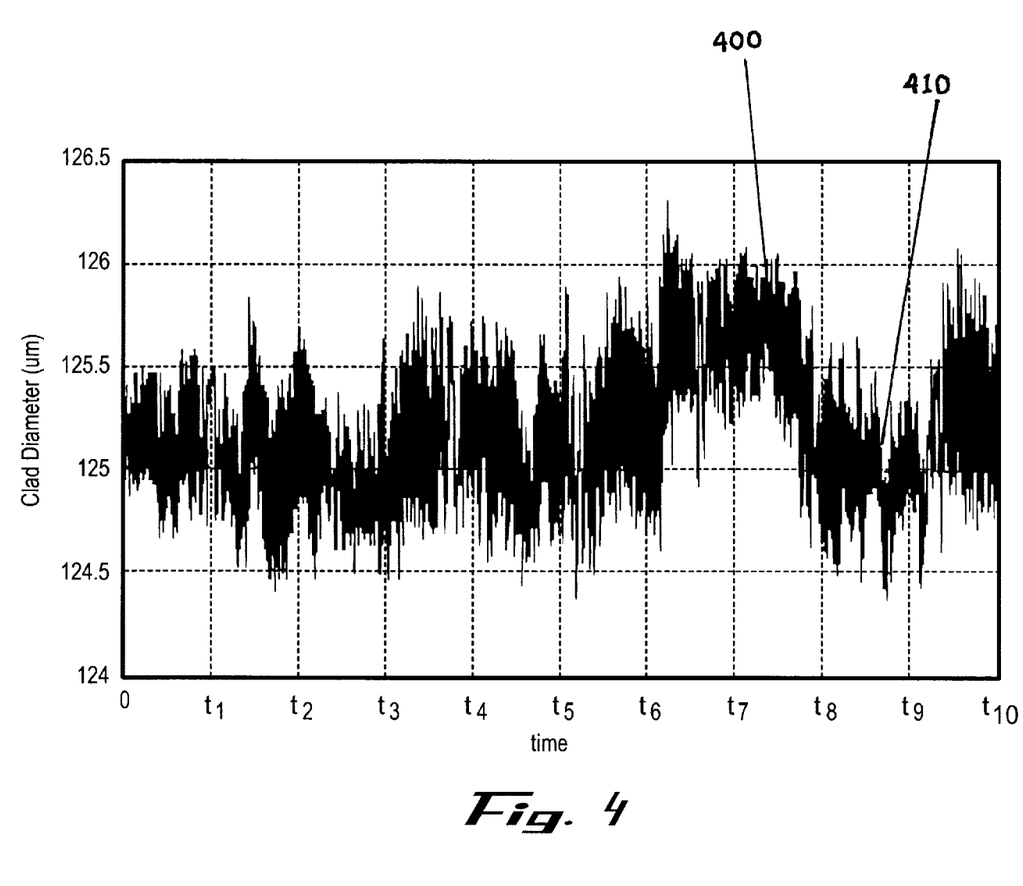
FIG. 4 illustrates exemplary signals derived from the fiber diameter monitoring mechanism according to one embodiment of the present invention.

Data representing the measurement signals as a function of time 387 from the diameter measurement device 386 results are shown in FIG. 4. Since a constant draw rate is assumed, the time function is proportional to the length of the fiber. Due to various conditions affecting the fiber as it is drawn, the optical fiber will exhibit regions with larger 400 and smaller 410 average diameters along its length, even in the absence of any spin. This is due to variations in the fiber diameter along its longitudinal axis during draw and is due in part to microscopic bubbles, localized heat variations in the preform, vibration, et cetera. FIG. 4 illustrates these inherent variations in the average fiber diameter along its length, signifying the presence of very low frequency signals. In addition to the previously identified factors impacting diameter measurements, various electrical noise sources inherent in electrical circuitry impacts the signal as well.

Figure 5:
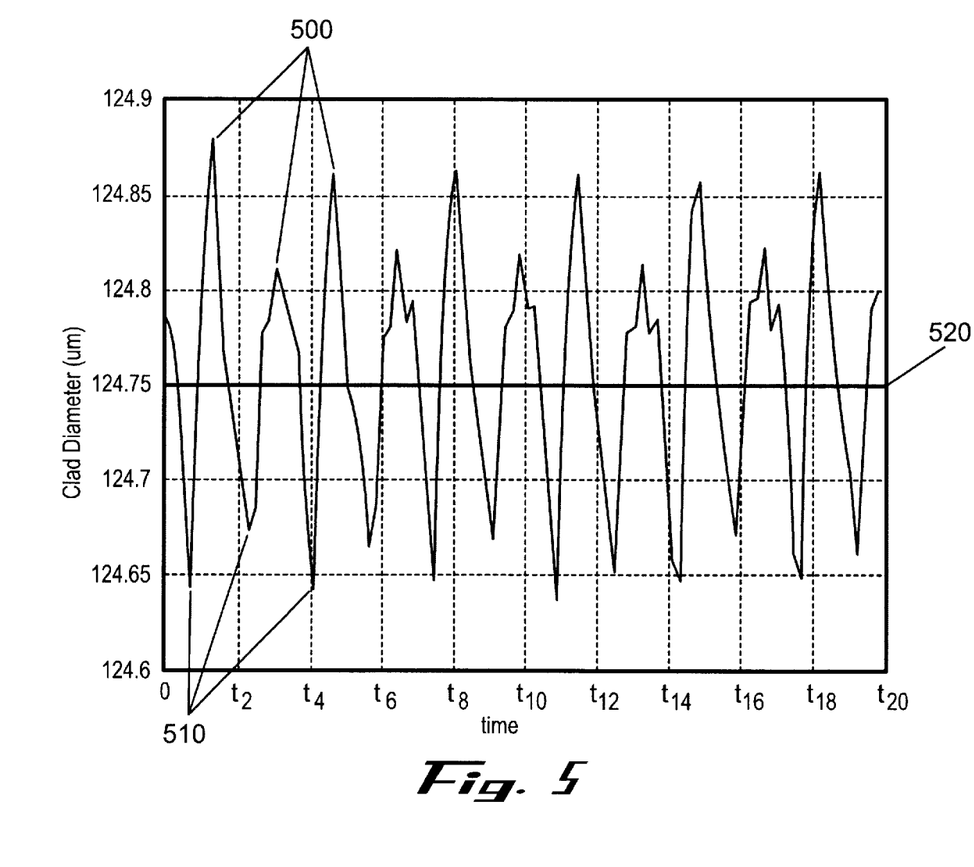
FIG. 5 illustrates exemplary diameter measurements as a function of time taken by a diameter monitoring mechanism according to one embodiment of the present invention.

FIG. 5 illustrates the fiber diameter measurements, but with an expanded time scale. As the fiber is drawn and simultaneously spun, the profile of the measured diameter periodically exhibits maximum and minimum values. As is evidenced in FIG. 5, the diameter along the major axis 130 of the fiber (as illustrated in FIG. 2) exhibits periodic peaks 500 of approximately about 124.82–124.87 $\mu$m. Further, as evidenced in FIG. 5, the diameter along the minor axis 140 is about 124.64–124.67 $\mu$m based on the periodic valleys 510. The average diameter can be estimated at about 124.75 $\mu$m 520.

Figure 6:
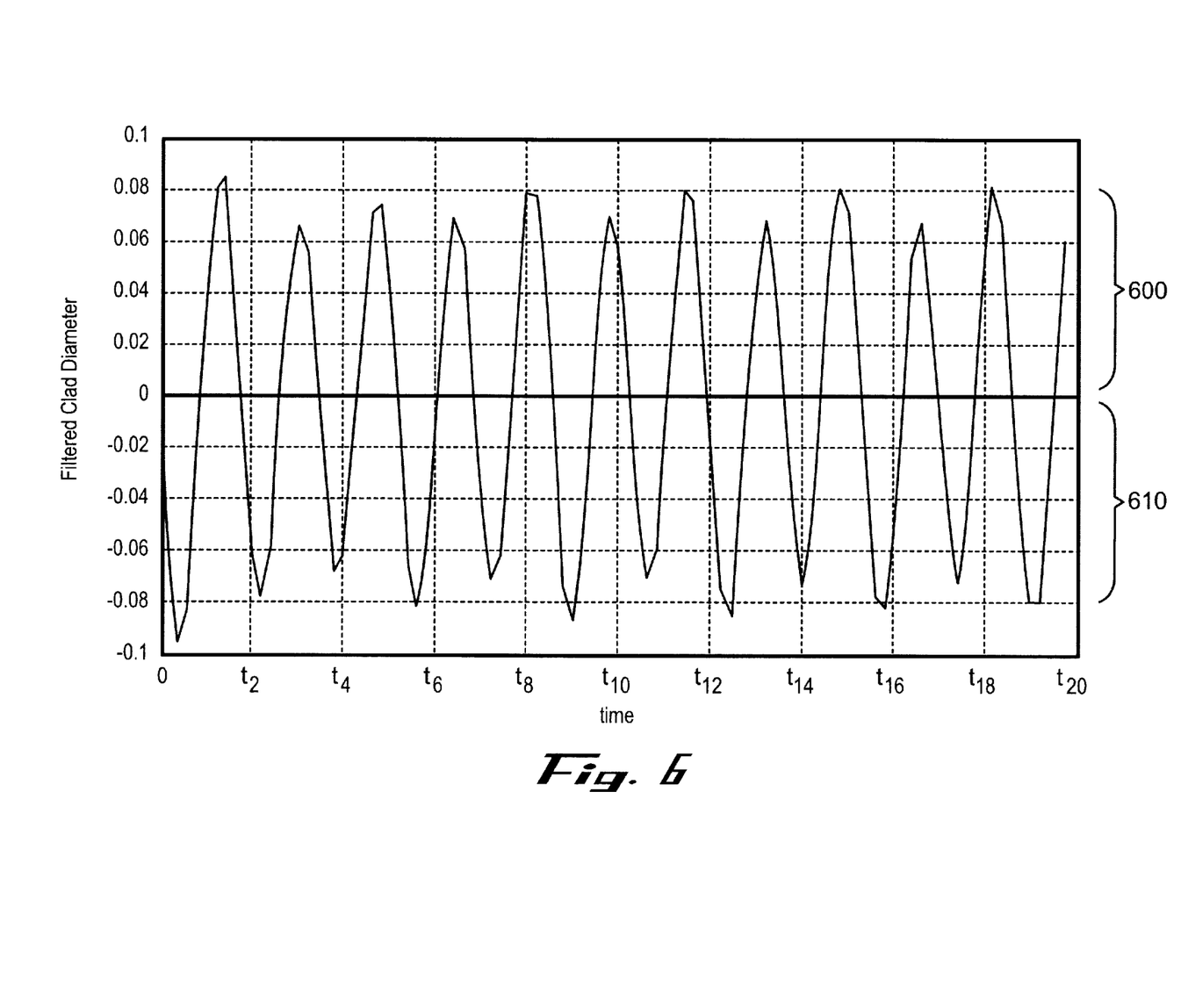
FIG. 6 illustrates an exemplary normalized diameter measurement as a function according to one embodiment of the present invention.

FIG. 5 illustrates the presence of higher frequency signals causing the 'jagged' waveform. The above factors cause changes in the diameter readings and can adversely impact the determination of the spin rate. Consequently, the measurement diameter signal 387 of FIG. 3A must be filtered using standard filtering techniques to remove spurious noise signals. The signal is subjected to a high pass filter 388 to remove high frequency components that represent spurious noise signals. Further, the signal is also subjected to a low pass filter 388 to remove certain low frequency signals corresponding to inherent variations of the average diameter of the optical fiber along its length. The low-pass filter results in a constant average diameter signal and does not filter out the frequency components of the signal corresponding to the diameter variations introduced by the spin. The frequency of the signal associated with diameter variations due to spin is a higher frequency than the diameter variations associated with changes in the average diameter. After filtering, the resulting signal 389 is illustrated in FIG. 6. FIG. 6 also shows a normalized amplitude (i.e., the direct current component having been filtered out), so that the average diameter is zero.

The determination of the number of spins over a given time period can be calculated in a variety of ways, but are based on a common principle. Namely, a single revolution of an elliptical fiber requires 360 degrees rotation of θ. This can be determined by detecting the maximum diameter as a starting point and detecting the next maximum diameter (which corresponds to 180 degrees of rotation) and then detecting a second next maximum diameter (which corresponds to 360 degrees rotation). Alternatively, using the minimum diameter can be detected or the average of the diameter can be monitored, and the every fourth average diameter indication will signify a single rotation.

Turning to FIG. 6, a positive value 600 indicates an above average diameter that indicates a measurement along or partly along the major axis view while a negative value 610 indicates a measurement along or partly along the minor axis view. The relative increase/decrease of the value indicates the relative rotation with respect to the major and minor axis. The number of rotations in a given time period can be calculated in a variety of ways as disclosed above, but using the normalized values. In the illustrative embodiment the rotations are determined by counting the number of zero crossings in a given time period and dividing by four.

$$\text{Rotations} = \frac{\text{Zero Crossings per time interval}}{4}$$

Once the number of rotations has been determined, the spin rate (rotations per length) can be easily determined by calculating the length of the fiber over which the measurements were taken. Because the draw rate is known, the spin rate is:

Spins/meter=Rotations/(Draw Speed*Time interval)

Figure 7:
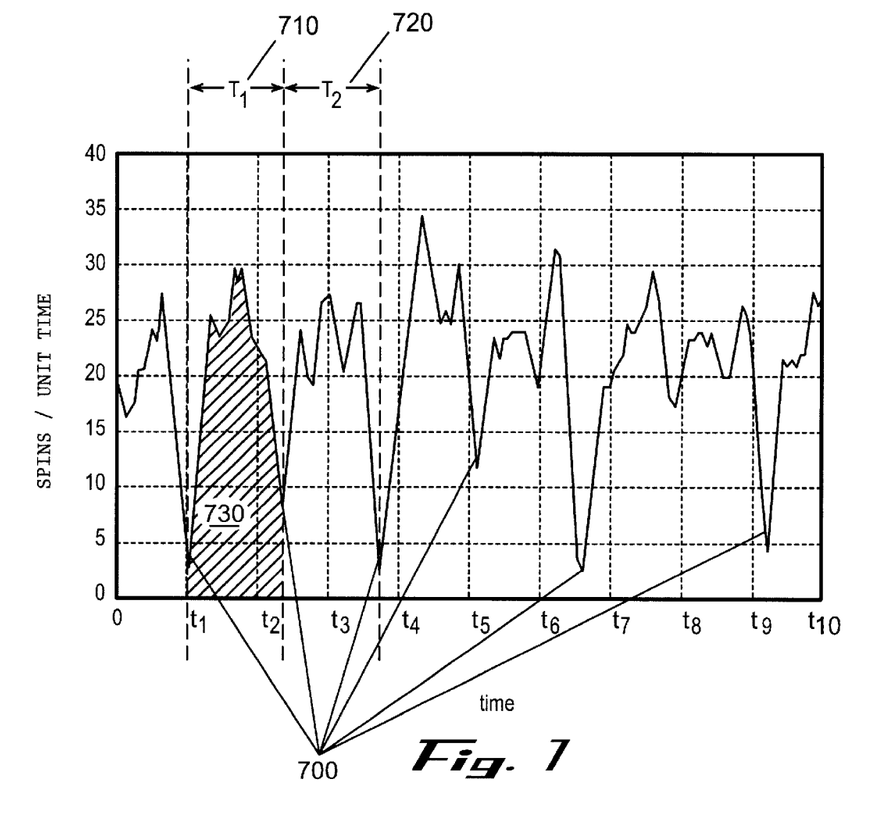
FIG. 7 illustrates an exemplary spin pattern measurement as a function of time according to one embodiment of the present invention.

FIG. 7 illustrates a typical spin pattern for an optical fiber mapping the spin rate (turns/meter) as a function of time.

As evident above, calculation of the spin rate involves basic arithmetic operations that can be performed relatively quickly using general purpose microprocessors, and does not require complicated, processor intensive, Fast Fourier Transform calculations. Because the required computation processing power to calculate spin is relatively modest, calculating the spin rate can be performed in real-time allowing real-time adjustments and monitoring of the spinning apparatus 50 to achieve the desired spin rate. Further, by monitoring the take-up rate as determined by the rotation speed of the take up capstan 60, the linear draw rate is known. This allows easy calculation of the real-time spin rate as a function over a length of optical fiber.

The above system can also be used to derive twist imparted into the optical fiber. Twist into the optical fiber can be introduced in a number of ways. Referring to FIG. 1, if a rotation is introduced on the fiber 25 between the neck-down region 20 and the spinning device 60, there is rotation introduced between the spinning device 60 and the take up roller 192. This is likely to introduce twist onto the fiber that remains after the fiber passes capstan 70. However, the prior art teaches the rotation introduced by the spinning device 60 alternates in direction (see e.g., Hart, U.S. Pat. No. 5,298,047). Thus, the rotation may be clockwise for a first time period, and then counterclockwise in a second time period. If the number of rotations introduced in one time period is offset by the number of rotations in the opposite direction, then the net rotations introduced is zero which should minimize any twist introduced upon take-up.

The spin data in FIG. 7 illustrates a spin rate function with respect to time. The valleys 700 represent instances in which the fiber rotation direction is altered. In theory, a reversal of direction corresponds to a point in the fiber in which the rotation is zero. Given the speed at which rotation changes can occur and limitations on the resolution of the illustrative embodiments, the data in FIG. 7 illustrates periodic valleys 700 which correspond to near zero rotations. For example, the peak during $T_1$ represents rotation in one direction, with rotation in the other direction occurring during $T_2$. Alternatively, the data can be correlated with the direction of rotation, and the spin rate reflect the rotational direction resulting in a graph in which positive values reflect one rotational direction and negative values reflect the other rotational direction.

Returning to FIG. 7, $T_1$ 710 illustrates a time period in which the rotation is in one direction, and $T_2$ 720 illustrates a time period in which the rotation is in the other direction. Although the valley 700 separating $T_1$ and $T_2$ is not quite zero, in theory, this point corresponds to a change in rotation direction that results in a zero value. The area 'under' the curve (i.e., bounded by the curve and the X axis) represents the integration of the waveform. For example, $\text{Area}_1$ 730 of the curve represents the integration of the waveform during $T_1$ 710. This area represents:

$$\text{Area} = \frac{\text{Spins}}{\text{meter}} * (\text{time}).$$

Since the draw rate can be assumed constant for $T_1$ and $T_2$, the corresponding lengths of the fiber drawn over $T_1$ and $T_2$ is the same. Thus, the graph of FIG. 7 could be redrawn in terms of spins/meter versus the length of the fiber (expressed in meters). This would be essentially the same graph, but with the X-axis representing fiber distance. The area under such a curve during $T_1$ (or $T_2$) would represent:

Area=(spins/meter)*meter

Area=spins

If the number of spins during $T_1$ is the same as the number of spins during $T_2$, but in different directions, then the net number of spins during the time period is zero. This results in a net twist of zero on the fiber for that duration (the duration which corresponds to a given length of fiber). Similarly, if the net number of spins is almost zero, the net twist can be maintained at or below a certain maximum desired level.

Because the system can measure spin and twist in real time, the result of the calculations performed on the data can be used to alter the spin rate, draw rate, or any other variable affecting the spin or twist in the fiber. Without real time measurements, real time control of the manufacturing is not possible. This system allows real time control of various parameters to minimize twist on the fiber.

Of course, those skilled in the art may employ alternatives, such as employ two systems for measuring spin rate at two points along the draw process. A first system could measure the spin rate near the neck down of the molten preform and the second system could measure the spin rate at a second point, for example, after the take up wheel. By comparing the spin rate along corresponding points (i.e., at slightly different points in time), and detecting any net difference in the spin rate, the different would be due to twist introduced during the manufacturing process.

Of course, other variations could be employed to illustrate the principles of the present invention. For example, rather then detecting the point of zero crossing, the system could detect the maximum and minimum diameters over a given time period. Alternatively, the derivative of the spin pattern could be calculated and used for determining when a major axis (maximum diameter) or minor axis (minimum diameter) has rotated passed the diameter measurement device. Similarly, determining the number of major (or minor) axis during a time period and dividing by four produces the number of rotations per time period. Therefore, it is to be understood that the invention is not to be limited to the specific embodiments disclosed and that modifications and other embodiments and algorithms for determining rotations are intended to be included within the scope of the appended claims. Although specific terms are employed herein, they are used in a generic and descriptive sense only and not for purposes of limitation.

What is claimed:

1. A method of determining spin imparted into an optical fiber, comprising:
    a) drawing an optical fiber from a heated preform;
    b) monitoring the rate of draw of the optical fiber;
    c) producing a signal representing the measurement of the diameter of the optical fiber with respect to time;
    d) detecting periodic variations in the diameter measurements from the signal; and
    e) processing the periodic variations in the diameter measurements and the rate of draw to determine the spin imparted into the optical fiber.

2. A method of determining spin imparted into an optical fiber according to claim 1 wherein said detecting periodic variations step comprises detecting periodic variations in the diameter measurements wherein the periodic variations in diameter measurements comprise relative maximum and minimum diameter values.

3. A method of determining spin imparted into an optical fiber according to claim 2 wherein a first maximum diameter value is detected, a second subsequent maximum diameter value is detected, a third subsequent maximum diameter value is detected, and the rate of spin is based on the time period from detecting the first maximum diameter value to detecting the third maximum diameter value.

4. A method of determining spin imparted into an optical fiber according to claim 2 wherein a first maximum diameter value is detected, a second subsequent maximum diameter value is detected, and the spin rate is based on twice the time period from detecting the first maximum diameter value and the second diameter value.

5. A method of determining spin imparted into an optical fiber according to claim 1 further comprising the step of filtering the signal representing periodic variations in measurements detected by said detecting step to exclude variations of the average diameter of the optical fiber along its longitudinal length and computing an average fiber diameter value.

6. A method of determining spin imparted into an optical fiber according to claim 1 wherein the spin imparted is clockwise in direction for a first limited duration and counterclockwise in direction for a second limited duration.

7. A method of determining twist on an optical fiber, comprising:
    a) drawing an optical fiber;
    b) introducing a rotational force on the optical fiber in a given direction;
    c) monitoring the rate of draw of said optical fiber;
    d) producing a signal representing the measurement of the diameter of the optical fiber with respect to time as it is being drawn;
    e) detecting periodic variations in the signal representing the diameter measurements; and
    f) processing the periodic variations in the diameter measurements and the rate of draw to determine the twist imparted into the optical fiber.

8. A method of determining twist on an optical fiber according to claim 7 wherein said detecting step comprises detecting periodic diameter measurements wherein periodic diameter measurements comprise relative maximum and minimum diameter values.

9. A method of determining twist on an optical fiber according to claim 7 wherein the relative maximum and minimum diameter values are processed to determine the spin rate function for a given length of optical fiber corresponding to a single direction of introduced rotational force, which is integrated over the given length of optical fiber to determine the twist of the optical fiber for the given length of optical fiber.

10. A system for determining rotations over a length of an optical fiber comprising:
    a drawing apparatus drawing optical fiber from a heated preform at a known draw rate;
    an optical fiber diameter measurement device measuring the diameter of said optical fiber as it is drawn from said heated preform;
    a spinning apparatus imparting spin on said optical fiber as it is drawn;
    a processor controlling operation of said spinning apparatus and the draw rate, said processor receiving measurements of the optical fiber diameter from said optical fiber diameter measurement device and determining the rotations over a length of said optical fiber.

11. A system for determining rotations of an optical fiber as in claim 10 wherein the processor operatively controls the spinning apparatus based in part on measurements received from said optical fiber diameter measurement device.

12. A system for determining rotations of an optical fiber as in claim 10 wherein said spinning apparatus imparts a spin in a clockwise direction for a first limited duration and a spin in a counterclockwise for a second limited duration.

13. A system for determining rotations of an optical fiber as in claim 10 wherein said processor controls the draw rate of said drawing apparatus based at least in part on the measurements from said optical fiber diameter measurement device of the fiber as the optical fiber is drawn from the preform.

14. A method of determining rotations along the longitudinal axis of an optical fiber, comprising:
    a) drawing an optical fiber past a fiber diameter measuring device at a known draw rate;
    b) imparting a rotational force to the optical fiber;
    c) producing a signal representing the measurement of the diameter of said optical fiber by the fiber diameter measuring device;

d) determining periodic changes in the signal representing the diameter measurement of the optical fiber; and e) processing the signal in conjunction with the known draw rate to determine the rotations along the longitudinal axis of the optical fiber.

15. A method of determining rotations along the longitudinal axis of an optical fiber as in claim 14 wherein the signal is further processed to determine spin imparted into said optical fiber.

16. A method of determining rotations along the longitudinal axis in an optical fiber as in claim 14 wherein the signal is further processed to determine twist on said optical fiber.

17. A method of determining rotations along the longitudinal axis in an optical fiber as in claim 14 wherein the step of processing periodic changes further comprises determining the number of rotations in the optical fiber during a time period in which the rotation is in a single direction.

* * * * *